United States Patent [19]

Shepard, Jr.

[11] 4,178,628
[45] Dec. 11, 1979

[54] SWITCHING TYPE REGULATED POWER SUPPLY

[75] Inventor: Francis H. Shepard, Jr., Summit, N.J.

[73] Assignee: R & I Patent Corporation, Morristown, N.J.

[21] Appl. No.: 905,232

[22] Filed: May 12, 1978

[51] Int. Cl.² ............................................. H02M 1/08
[52] U.S. Cl. ..................................... 363/25; 363/134; 307/151
[58] Field of Search ................. 307/11, 150, 269, 151, 307/35; 363/49, 55, 56, 75, 76, 78, 91, 95, 97, 98, 24, 25

[56] References Cited

U.S. PATENT DOCUMENTS

| 3,210,637 | 10/1965 | Gams | 363/91 |
| 3,418,557 | 12/1968 | Schaefer | 363/97 |
| 3,495,129 | 2/1970 | Donner | 363/55 |
| 3,818,307 | 6/1974 | Hamilton | 363/25 |
| 3,873,903 | 3/1975 | Koetsch | 363/25 |

Primary Examiner—L. T. Hix
Assistant Examiner—S. D. Schreyer
Attorney, Agent, or Firm—Burgess, Ryan and Wayne

[57] ABSTRACT

A power supply of the switching type having alternately conductive switching transistors coupled to the primary of a transformer, in which a control circuit insures that the switching transistors are never simultaneously conductive. The control circuit utilizes two multivibrators having a common timing circuit for generating pulses which have their leading edges synchronized and are such that the width of the pulses from one multivibrator is never less than the width of the pulses from the other multivibrator, thus insuring a minimum dead time interval between the on times of the alternately switched transistors. Circuit protection is provided by sensing and feedback of the current through the transformer secondary or primary windings, and by sensing the saturation voltage across the switching transistors, to regulate the duty cycle of the pulses generated by the control circuit. Power for the control circuit and the switching transistor drive circuitry is provided from the secondary of the transformer. A starting circuit, after a delay, provides operating voltage to the control and driving circuitry by charging of the capacitors to provide temporary power supply to said circuits until the power therefor can be supplied from the secondary winding of the transformer. The integrated output voltage derived from at least a portion of the secondary winding is duty cycle regulated by a saturable reactor circuit operating in the avalanche mode.

12 Claims, 7 Drawing Figures

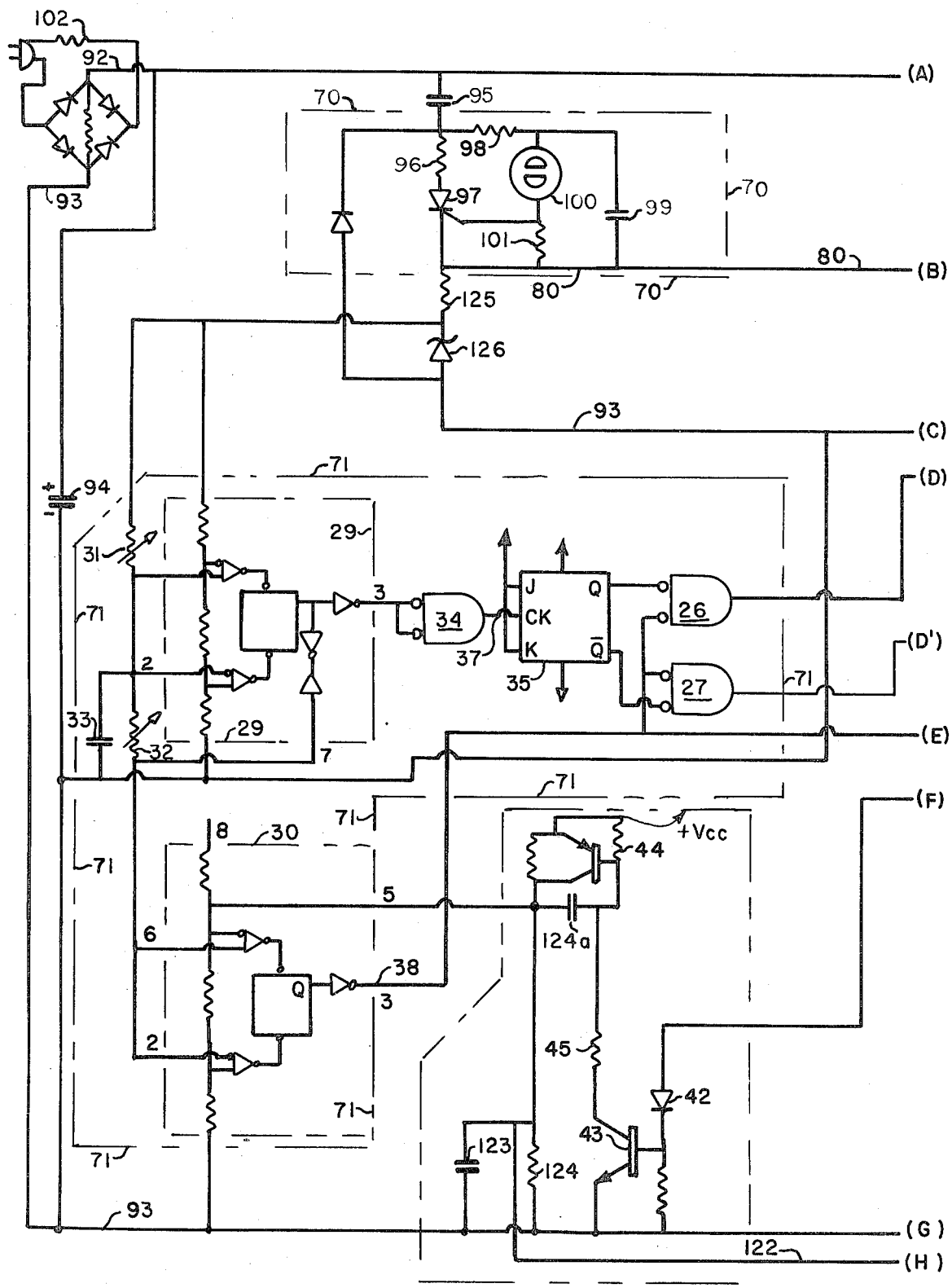
Fig. 4 Sheet 1

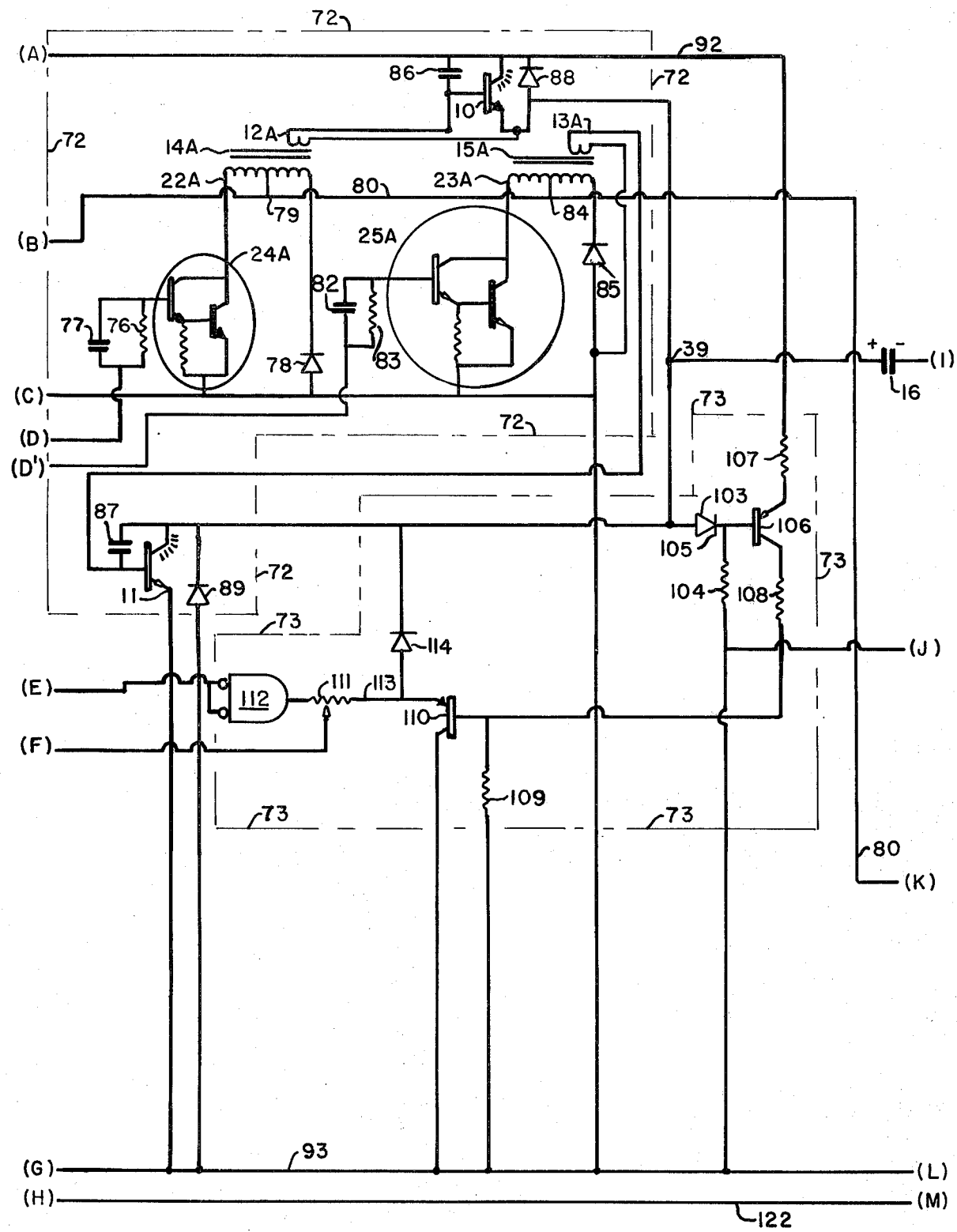
Fig. 4 Sheet 2

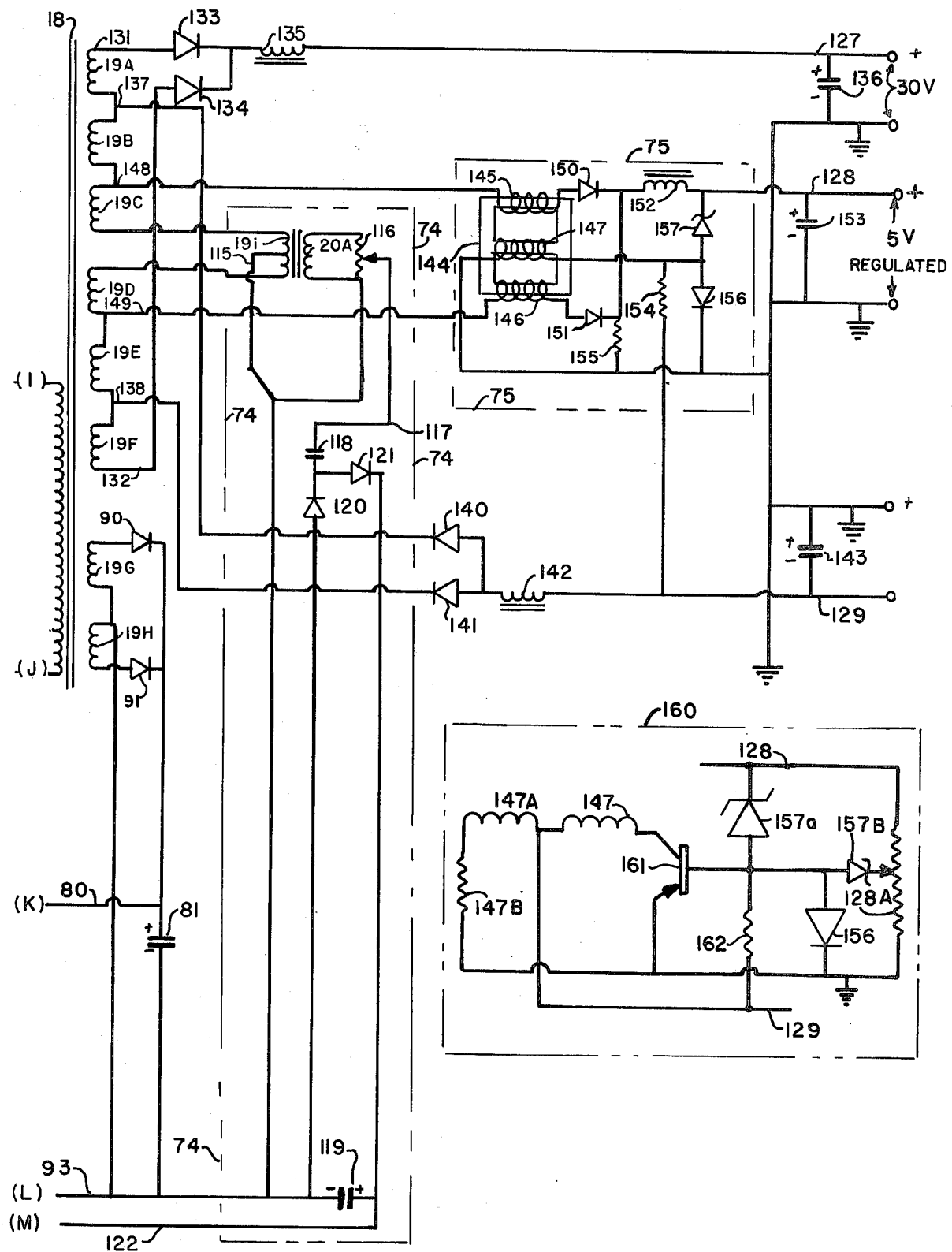
Fig. 4   Sheet 3

SWITCHING TYPE REGULATED POWER SUPPLY

BACKGROUND OF THE INVENTION

This invention relates to a switching type power supply of the type employing alternately conductive switching elements.

Switching type power supplies are well known in the art, and generally employ a transformer having a primary winding provided with an alternating current by two or more switching transistors, and a secondary winding coupled to rectifying and filtering means for delivering one or more DC voltages to a corresponding load or loads.

When such power supplies are operated at high power levels, it is essential to insure that the alternately conductive switching transistors never are both "on" at the same time, a condition which would cause the destruction of said transistors. While circuits are presently available for assuring such non-coincidence, such as the "Switch Mode Regulator Control Circuit" sold by Motorola Semi-Conductors, Phoenix, Ariz. as integrated circuit Nos. MC 3420 and MC 3520, these circuits are relatively complex and there is need for a relatively simple and inexpensive control circuit for this purpose.

There is also need for circuitry to sense an overload condition of the switching transistors as rapidly as possible, so that feedback and control of the drive voltage to said transistors can be modified in sufficient time to prevent destruction of the switching transistors.

In a switching type power supply of the aforementioned type having a plurality of secondary output voltages, there is need for a relatively simple regulator which is capable of regulating a given one of said secondary voltages without adversely affecting the other secondary voltages.

In order to provide improved efficiency and an additional margin of safety, it is desirable that the circuitry which provides the driving signal voltages to the switching transistors be supplied with power from the secondary winding of the transformer, so that a short circuit condition at the load or loads will immediately result in a loss of drive to the switching transistors to disable the same thus protecting the supply from damage in the event of such a short circuit condition at the load.

Accordingly, an object of the present invention is to provide a switching type power supply having one or more of the aforementioned features.

SUMMARY OF THE INVENTION

As herein described there is provided a switching type power supply, comprising first and second alternately conductive semiconductor switching elements, said elements being rendered conductive in response to first and second respective switching control signals, said signals having a predetermined dead time therebetween; transformer means coupled to said switching elements and to output terminals for connection to a load; first and second multivibrator means having a common timing circuit for generating periodic first and second control pulses having substantially coincident leading edges, the width of said second pulses being at all times at least equal to the width of said first pulses, the width of said first pulses defining said dead time; a bistable circuit for generating first and second rectangular waveforms having transitions aligned with the trailing edges of said first control pulses; and first and second AND gates responsive to said second control pulses and respective ones of said rectangular waveforms for modifying said rectangular waveforms to provide transitions therein corresponding to the leading and trailing edges of said second control pulses, the outputs of said AND gates corresponding to said modified waveforms and to said first and second switching control signals respectively.

According to still another feature of the invention there is provided in a switching type power supply having first and second alternately conductive semiconductor switching elements, said elements being operated between saturation and open circuit conditions, circuit protection means comprising a first sensing transistor having control and output electrodes; means for coupling the voltage developed across said first switching element to the control electrode of said first sensing transistor when said first element is conductive, said first sensing transistor conducting a relatively low current when said first element is saturated and a relatively high current when said first element is not saturated, and the voltage at said output electrode thereof having a first value when said first element is saturated and a second value when said first element is not saturated; a second sensing transistor having emitter, base and collector electrodes; means for coupling the output electrode of said first sensing transistor to said base electrode; means for coupling the voltage developed across said second switching element to the emitter electrode of said sensing transistor when said second element is conductive, said coupled emitter voltage being relatively low when said second element is saturated and being relatively high when said second element is not saturated, said emitter voltage also being relatively high when said base voltage is relatively high, i.e. when said first switching element is not saturated; periodically conductive biasing means for providing a bias voltage to said emitter of said second sensing transistor only when both of said switching elements are nonconductive; and means for reducing the periods of conduction of said switching elements when the voltage of said emitter electrode of said second sensing transistor exceeds a predetermined threshold value.

According to still a further feature of the invention there is provided a switching type power supply, comprising transformer means having a primary winding and a plurality of secondary windings; switching means for periodically coupling said primary winding to a source of potential difference; rectifying means coupled to each of said secondary windings; a saturable reactor coupled to one or more of said secondary windings and to the corresponding rectifying means, said reactor having first and second output windings each output winding being coupled in series between one terminal of said secondary winding and a corresponding output terminal for unidirectional current flow therethrough, said reactor having a control winding coupled to an output terminal of another of said secondary windings for unidirectonal current flow through said control winding, the direction of current flow through said control winding relative to the direction of current flow through said output windings being such that said windings tend to generate magnetic flux in the same direction in said reactor; and a threshold switching element coupled between an output terminal of said secondary winding and said control winding for substantially decreasing the current in said control winding when the voltage at said output terminal exceeds a predetermine value, whereby said output windings initially present a low impedance to currents flowing therethrough, and after said voltage exceeds said predetermined value said control winding becomes effectively inactive and said output windings provide duty cycle regulation of the currents therethrough, said reactor thus operating in an avalanche mode.

Another feature of the invention provides in a switching type power supply having a pair of alternately conductive switching elements, rectifying and capacitive filtering means coupled to said switching element a control circuit coupled to said filtering means and to said switching elements and transformer means for coupling said switching elements to a pair of secondary output terminals, said control circuit initially receiving power from said filtering means and subsequently receiving power from said output terminals, a starting circuit comprising an auxiliary filter capacitor capacitively coupled to said filtering means; a time delay switching circuit coupled in series between said filtering means and said auxiliary capacitor, said circuit coupling said auxiliary capacitor to said filtering means for a limited time interval a predetermined time after charging of said filtering means has commenced, said control circuit being coupled to receive power initially from said auxiliary capacitor, and means for coupling said output terminals to said auxiliary capacitor to provide power to said control circuit before said limited time interval has elapsed.

DETAILED DESCRIPTION

In the drawing:

FIG. 4 is a schematic diagram of a switching type power supply in accordance with a preferred embodiment of the invention;

NONCOINCIDENCE TIMING CIRCUIT

Figure 1:
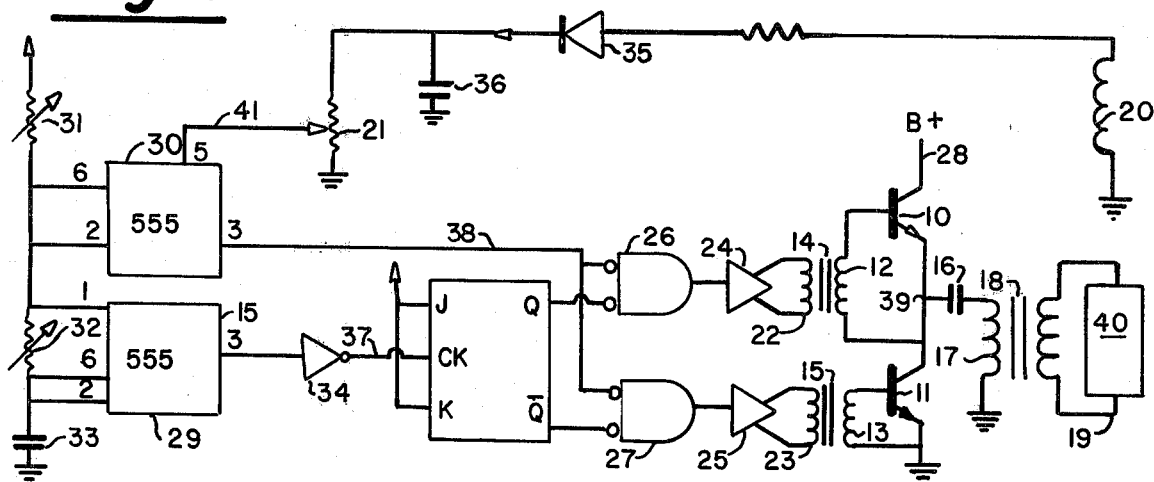
FIG. 1 illustrates a noncoincidence switching transistor control circuit in accordance with a preferred embodiment of the present invention.

FIG. 1 is a simplified functional schematic diagram of a switching type power supply, for purposes of explaining the operation of the noncoincidence circuit employed therein. In this circuit switching transistors 10 and 11 are connected in tandem and are controlled by signals at the secondary windings 12 and 13 of drive transformers 14 and 15 to which they are respectively connected, to render said transistors alternately conductive. When transistor 10 is conductive current flows through the collector and emitter electrodes thereof, the capacitor 16, and the primary winding 17 of an inverter transformer 18. When transistor 10 is non-conductive and transistor 11 is conductive, the primary winding 17 "discharges" through the capacitor 16 and collector and emitter electrodes of the transistor 11.

Thus, as the switching transistors 10 and 11 are alternately rendered conductive, an alternating current is caused to flow in the primary winding 17 of the inverter transformer 18, inducing a voltage in the secondary winding 19 and any other secondary windings of said transformer.

The integrated rectified output of the secondary feedback winding 20 provides a voltage across potentiometer 21 which is a measure of the current in the secondary winding 19.

The driving signals to the primary windings 22 and 23 of the drive transformers 14 and 15 respectively, are provided by respective amplifiers 24 and 25, which are driven by corresponding NAND gates 26 and 27 respectively. For purposes of this description, a NAND gate is considered to be a type of AND gate since both types of gates provide output signals only when all inputs thereto are present. A NAND gate differs from an AND gate only in that it provides an output only when negative input signals thereto are present. In the embodiments herein described, a NAND gate passes the negative signals while an AND gate passes the positive signals. Thus, the difference between a NAND gate and an AND gate is merely a matter of definition of the nature of the input signals, i.e. whether a "signal" is defined as the presence of a positive or negative condition.

It is important that the transistors 10 and 11 be controlled so that both transistors are never simultaneously conductive. If such a simultaneous conduction condition were to occur, the transistor 10 and 11 would effectively short circuit the supply voltage from the B+ terminal 28 to ground, thus destroying said transistors.

In many prior art drive circuits for operating alternately conductive switching transistors, the drive pulses applied thereto are derived directly from oppositely polarized outputs of a bistable circuit, so that as one transistor is driven off the other transistor is simultaneously driven on. In high power applications, however, it has been discovered that, due to minority carrier storage effects within the transistors, each switching transistor does not turn off when the drive signal is removed therefrom, but rather remains conductive for an interval of time, known as the "storage time", before turning off. Due to this storage time effect, high power switching circuits operated from oppositely polarized outputs of a bistable circuit result in a condition wherein the transistors may be simultaneously conductive for a brief period of time when switching therebetween occurs. Unfortunately, this brief period of time of simultaneous conduction is often sufficient to result in destruction of the transistors.

The remaining circuit elements of FIG. 1 comprise a control circuit for providing a driving voltage to the transistors 10 and 11 via the amplifiers 24 and 25 respectively, with a predetermined "dead time" between the time each transistor turns off and the other transistor turns on. This dead time is provided with a minimum value greater than the storage time of each transistor, to completely eliminate any possibility of simultaneous conduction of the transistor 10 and 11.

The aforementioned control circuit comprises a first multivibrator 29, a second multivibrator or level triggered flipflop 30, a common resistance-capacitance timing circuit for said multivibrators comprising a resistor 31, another resistor 32, and a capacitor 33; an inverter 34, a bistable circuit or flipflop 35, and the NAND gates 26 and 27.

Figure 2:
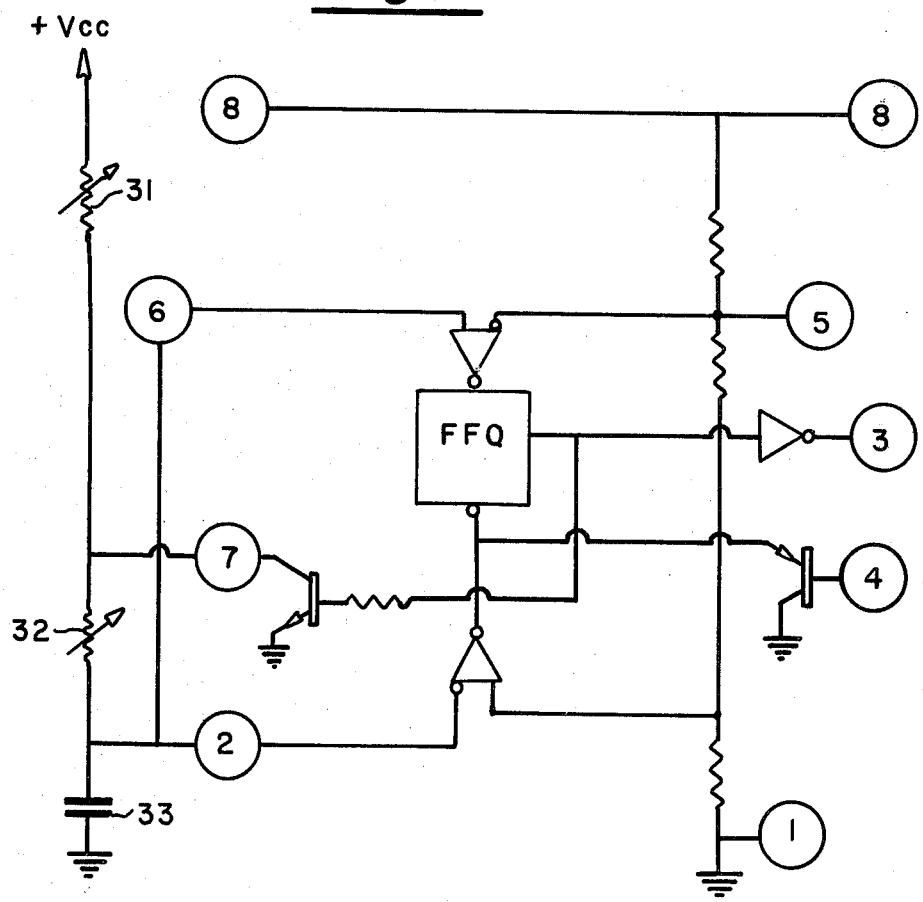
FIG. 2 shows the equivalent circuit of one of the integrated multivibrator circuits employed in the arrangement of FIG. 1.

Each of the multivibrators 29 and 30 comprises a type 555 integrated circuit, currently available from Texas Instruments and a number of other sources, and having an equivalent circuit as shown in FIG. 2. Alternatively, if desired, a type 556 integrated circuit may be employed, which circuit essentially consists of two types 555 circuits on a single integrated circuit chip.

The "threshold" and "trigger" terminals of the second multivibrator 30, as well as the "discharge" terminal of the first multivibrator 29, are connected to one end of the variable* resistor 31, the other end thereof being connected to a source of B+ or DC potential. The "threshold" and "trigger" terminals of the first multivibrator 29 are connected to the junction of the resistor 32 and the capacitor 33, with the other end of the resistor 32 being connected to the end of the resistor 31 remote from B+, and the other end of the capacitor 33 being connected to ground. Each of said multivibrators provides an output signal at terminal 3 thereof. A control voltage is applied to terminal 5 of the second multivibrator 30, said voltage being taken from the arm 34 of the potentiometer 21, which is applied with a DC voltage corresponding to the voltage across the secondary feedback winding 20, via the rectifier 35 and filter capacitor 36.

*Normally, these resistors are variable only for the purpose of setting the initial frequency of operation and the desired "dead time". Once the resistors have been set, they are not varied during normal circuit operation.

Figure 5:
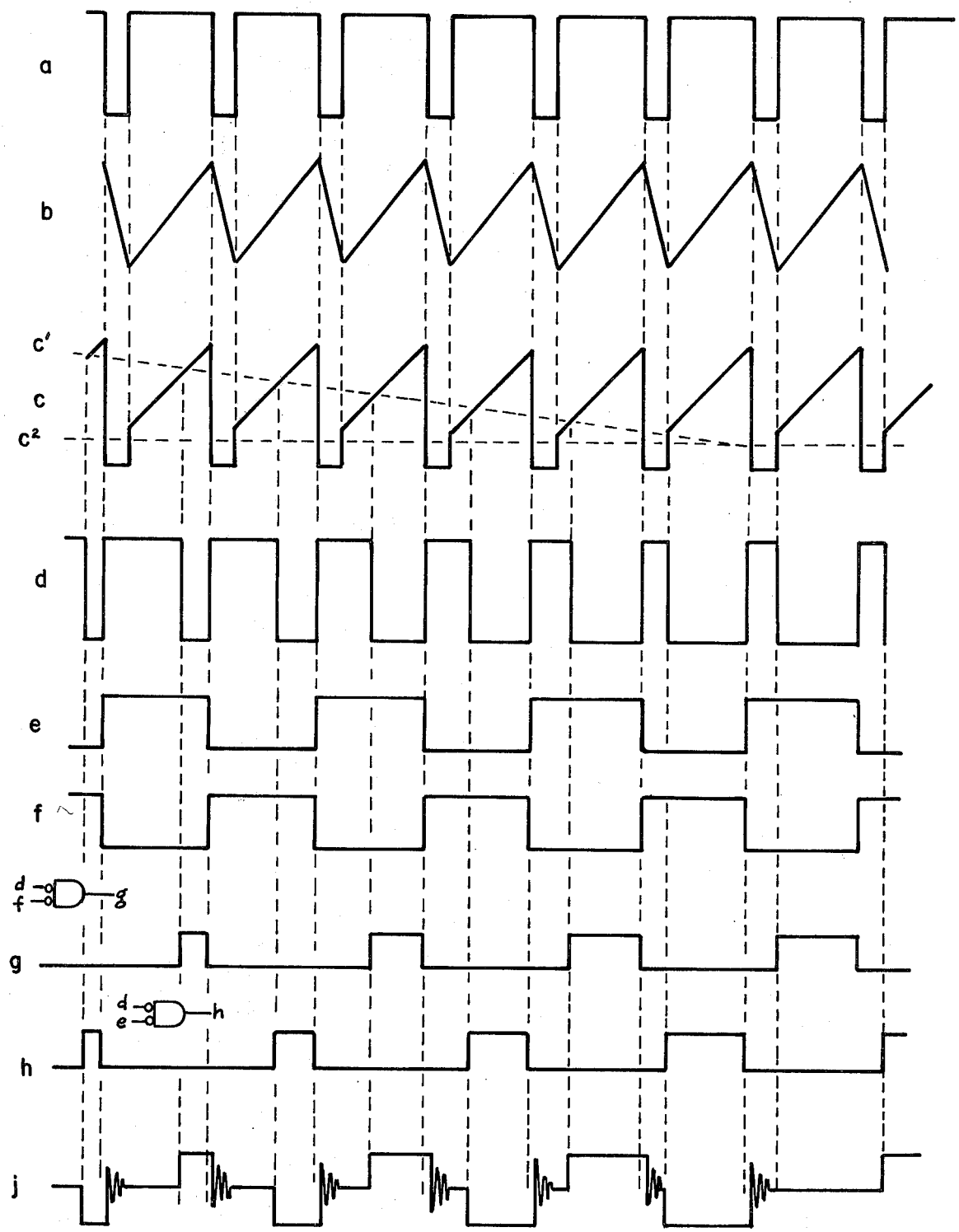
FIG. 5 shows voltage waveforms associated with the noncoincidence control circuit shown in FIG. 1 and which forms a portion of the power supply shown in FIG. 4.

With this circuit arrangement, the multivibrator 29 acts as an astable multivibrator, providing an output signal, which viewed on the output line 3 of the multivibrator 29, has the voltage waveform shown at (a) in FIG. 5.

The second multivibrator 30 is "triggered" by the signal at the junction of resistors 31 and 32, and acts as a monostable multivibrator having a voltage waveform on the output line 38 thereof, which is as shown at (d) in FIG. 5.

Each of the multivibrators 29 and 30 is internally identical to the other, and each multivibrator is constructed to provide a predetermined minimum pulse width when zero control voltage is applied to the control terminal 5 thereof. The just mentioned minimum pulse is negative for multivibrator 1 and positive for multivibrator 2. Since the control terminal 5 of the first multivibrator 29 is not used, the output thereof at terminal 3 at all times corresponds to said predetermined minimum negative pulse width. Since both multivibrators utilize a common timing circuit comprising resistors 31 and 32 and capacitor 33, the leading edges of the pulses produced by said multivibrators are coincident at all times. Since the control voltage applied to the control terminal 5 of the second multivibrator 30 is never less than zero, the positive pulse width provided by said multivibrator 30 on line 3 at all times at least equal to the negative pulse width provided by the multivibrator 29, at terminal 3 thereof and positive on line 37 at the output of the inverter 34. The feedback voltage from the winding 20 varies the width of the pulses provided by the second multivibrator 30, so as to regulate the integrated voltage developed across the feedback winding 20, and thus the integrated output of the secondary winding 19 of the transformer 18.

Preferably, the resistor 31 has a substantially higher value than the resistor 32, and variation of the resistor 32 serves to vary the minimum pulse width provided by the multivibrators 29 and 30, while variation of the resistor 31 serves to control the frequency of said pulses.

The output pulses on line 37 from the inverter 34 are coupled to a clock input terminal CK of the bistable circuit or J-K flipflop 35, so that the oppositely poled outputs Q and $\overline{Q}$ thereof undergo transitions coincident with the trailing edges of the pulses on line 37. The output Q of the flipflop 35 is coupled to one input terminal of the NAND gate 26, the output $\overline{Q}$ of said flipflop being coupled to one input terminal of the NAND gate 27. The output of the second multivibrator 30 on line 38 is coupled to the other input terminal of each of said NAND gates.

FIG. 5 (e) shows the voltage waveform of the output Q of the flipflop 35, while FIG. 5 (f) shows the voltage waveform of the output $\overline{Q}$ thereof. The output of the NAND gate 26, i.e. the drive signal for the transistor 10, has a voltage waveform as shown in FIG. 5 (g) while the output of the NAND gate 27, i.e. the drive for the transistor 11, has the voltage waveform shown in FIG. 5 (h).

Thus, it is clear from FIG. 5 that the drive signals for the transistors 11 and 12, as shown in FIGS. 5 (g) and 5 (h) respectively, are non-coincident, with the dead time therebetween being equal to the width of the positive output pulses provided by the second multivibrator 30 on line 38, and with said dead time having a minimum width determined by the setting of the resistor 32 and the value of the capacitor 33.

The waveform of the output voltage at the junction 39 of the switching transistors 10 and 11, is as shown in FIG. 5 (j). The upper level in this waveform corresponds to the time that transistor 10 is on, while the lower level corresponds to the time that transistor 11 is on, and the middle level corresponds to the dead time therebetween. The ringing which occurs immediately after each transistor becomes non-conductive, is caused by resonance between the open circuit reactance of the primary winding 17 and stray circuit capacitance.

The transistors 10 and 11 do not turn off when the corresponding drive signals illustrated in FIGS. 5 (g) and 5 (h) terminate, but said transistors remain conductive for a period of time, known as the storage time, and corresponding to the time required for removal of excess minority carriers from the base region thereof. As can be seen in FIG. 5 (j), the minimum width of the dead zone between on times of the respective transistors 10 and 11, is substantially greater than the storage time of each transistor.

While the wide availability and low cost of the type 555 integrated circuit makes it particularly suitable for use in the arrangement shown in FIG. 1, other integrated circuit or discrete multivibrator circuits operating in a similar manner may alternatively be employed. The essential features of interest are that said multivibrator circuits employ a common timing circuit, and are such that the pulse width of the second multivibrator circuit, which determines the off time of the output, is at all times at least equal to the pulse width of the first multivibrator circuit.

The secondary output winding or windings 19 of the inverter transformer 18 may be coupled through suitable rectification and filtering circuitry to one or more loads, said rectifying and filtering circuitry and loads being generally indicated as block 40 in FIG. 1.

Thus the switching regulator shown in FIG. 1 operates to provide a drive to the transistors 10 and 11 which assures that said transistors are never simultaneously conductive, and provides duty cycle regulation of the output of the secondary winding 19 via control of the pulse width of the multivibrator by the integrated value of the voltage developed across the feedback winding 20. Since an increase of the integrated value of the voltage developed across the winding 20, corresponding to an increase in output of the transformer 18, results in an increase in the pulse width of the output of the multivibrator 30, and hence in the dead time, the on time of the transistors 10 and 11 is reduced, thus reducing the output of transformer 18, and providing negative feedback to regulate said output to a desired value. The value at which the output of the transformer 18 is regulated may be set via the potentiometer 21. It should be noted that the outputs referred to are always the time integrated outputs that are duty cycle controlled.

CURRENT LIMITING FEEDBACK CIRCUIT

An additional feedback arrangement for regulating the output current provided by the secondary winding 19, utilizing the control circuitry shown in FIG. 1, is illustrated in FIG. 4, sheet 3. In this circuit, current limiting is provided by the current transformer sensing winding 19i, which is in series with the winding 19 and designed so that the voltage developed across the secondary winding 20A is a measure of the current of the winding 19.

It should be noted here that the current sensing winding 19i could be placed in series with any output winding of which it is desired to sense the current. It may even be in series with the primary 17 of the main output transformer. The current proportional AC voltage output of current transformer 20a is attenuated by potentiometer 116 before being rectified peak-to-peak via condenser 118 and diodes 120 and 121, filtered by condensers 119 and 123 (FIG. 4 sheets 1 and 4) (applied thru connector line 122) to the duty cycle control input 5 of multivibrator 30. Adjustment of potentiometer 116 will set the level of current above which duty cycle will be reduced, thus limiting output current to safe values. When load currents are reduced to acceptable limits, normal operation is resumed.

Figure 3:
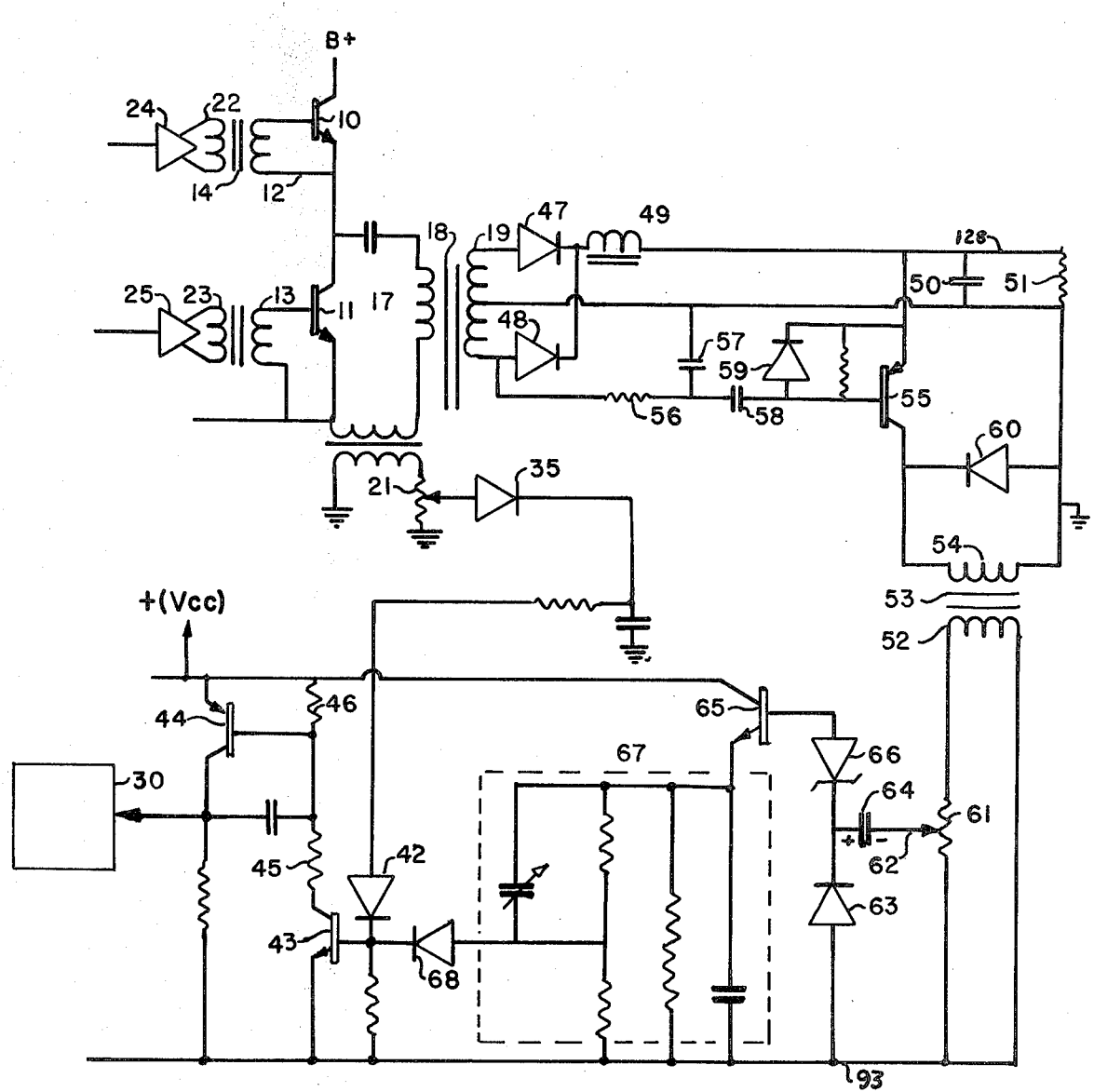
FIG. 3 illustrates a voltage sensing and feedback control circuit for duty cycle regulation of the output voltage of a power supply in accordance with an alternative embodiment of the invention.

As shown in FIG. 3, the secondary winding 19 is center tapped, and connected in a full wave rectification and filtering circuit, comprising diodes 47 and 48, filter inductor 49, and filter capacitor 50. The load 51 is coupled across the terminals of the filter capacitor 50, and the DC voltage developed across the load is equal to the rectified time integral of the secondary winding AC voltage.

An alternating voltage having an amplitude corresponding to the output voltage across the load is provided by the secondary winding 52 of a sensing transformer 53 having a primary winding 54 connected across the output terminals, i.e. across the filter capacitor 50, via the collector to emitter path of a transistor 55. A pulsed negative control voltage for the base of the transistor 55 is provided from one terminal of the winding 19 via a filter comprising resistor 56 and capacitor 57, and a rectification circuit comprising capacitor 58 and diode 59. Thus a negative pulse is applied to the base of transistor 55 during each cycle of the waveform provided to the primary winding 17 of the transformer 18, so that the transistor 55 is rendered conductive and the winding 54 is connected directly across the output terminals to which the load 51 is connected, once during each such cycle.

Thus a voltage is developed across the primary winding 54 and the secondary winding 52 of the sensing transformer 53 which has a frequency equal to that applied to the primary winding 17 of the inverter transformer 18, the amplitude of the voltage across the secondary winding 52 being proportional to the voltage developed across the load 51.

The diode 60 serves to damp the primary winding 54 during the periods when the transistor 55 becomes non-conductive.

The alternating voltage developed across the secondary winding 52 of the sensing transformer 53 is applied to a potentiometer 61 which serves to adjust the output voltage across the load 51 as established by the regulating circuit of FIG. 3. The corresponding alternating voltage on the arm 62 of the potentiometer 61 is converted to a DC level by the peak detector comprising rectifying diode 63 and capacitor 64, and is coupled to the base of a transistor 65 through a level shifting Zener diode 66. Transistor 65 acts as an impedance shifting emitter follower, with the emitter thereof coupled to the base of the transistor 43 through a stabilizing resistance capacitance network 67 and a diode 68. This voltage applied to the base of transistor 43 causes said transistor to become conductive, thus rendering transistor 44 conductive and applying B+ voltage to the control terminal 5 of multivibrator 30, to effectively shut off or reduce conduction time of transistors 10 and 11.

Thus, whenever the output voltage across the load 51 exceeds a predetermined threshold value (as set by the potentiometer 61), the circuit of FIG. 3 (the remaining portion of which is shown in FIG. 1) operates to turn the transistors 10 and 11 off until the output voltage decreases to the pre-set threshold level. The circuit will then resume normal operation and hold the output voltage to the desired level. Thus the circuit of FIG. 3 operates in such a manner as to regulate the output voltage across the load 51 to a desired value.

In FIGS. 1 and 3, circuit elements having corresponding identifying numerals are identical and perform the same functions, and in FIG. 4 circuit elements having numerals corresponding to those of FIGS. 1 and 3 also perform corresponding functions.

Preferably, the transistors 10 and 11 shown in FIGS. 1, 3 and 4, are switched at a supersonic frequency sufficiently high to allow relatively compact transformers to be employed, and sufficiently low so that losses due to hysteresis effects are not excessive. A frequency on the order of 20 kilohertz is preferred.

The overall operation of a switching type power supply according to a preferred embodiment of the invention will be best understood by reference to FIG. 4, wherein major operating sub-systems are shown in dashed blocks. These sub-systems are:

The starting sub-system, indicated at 70;

The non-coincidence control sub-system, indicated at 71;

The primary winding drive sub-system, indicated at 72;

The switching transistor saturation voltage detection circuit, indicated at 73;

The current feedback and regulating sub-system, indicated at 74; and

The saturable reactor secondary voltage avalanche mode duty cycle regulating sub-system at 75.

The non-coincidence control sub-system 71 corresponds to that shown in FIG. 1, and further description thereof is unnecessary.

The output of NAND gate 26 is coupled to the first base of a Darlington circuit 24A (preferably an integrated circuit) through the parallel combination of resistor 76 and capacitor 77. The output or collector of the Darlington circuit 24A is connected to one end of the primary winding 22A of the drive transformer 14A. The cathode of a diode 78 is connected to the other end of the primary winding 22A, with the anode of said diode being grounded. A center tap 79 of the primary winding 22A is connected to a power supply bus 80.

In operation, the Darlington circuit 24A is rendered conductive upon receipt of positive pulses from the NAND gate 26, and when conductive allows current to flow from the supply bus 80 through the center tap 79 to the end of the winding 22A to which the collector of the Darlington 24A is connected, thus inducing a drive voltage in the secondary winding 12A. When the Darlington circuit 24A becomes non-conductive, dissipation of the energy stored in the magnetic field of the transformer 14A is accomplished through a damping effect by current flow through the diode 78 (FIG. 4, sheet 2) and the portion of the winding 22A to which the cathode of said diode is connected, to the supply bus 80, returning energy to the filter capacitor 81, and thus effectively increasing the energy efficiency of the circuit it also limits the negative turn off drive, to safe values, for the switching transistors.

In similar fashion, positive pulses from the output of the NAND gate 27 are coupled to the Darlington circuit 25A through the parallel connected resistor 82 and capacitor 83. The output of the Darlington 25A is coupled to one end of the primary winding 23A of the drive transformer 15A, with the center tap 84 of said primary winding being connected to the supply bus 80, and the other end of the winding 23A being connected to the cathode of a damping diode 85, the anode of said diode being grounded. The operation of this circuit in conjunction with the transformer 15A is the same as the operation of the circuit including the Darlington 24A and transformer 14A.

The terminals of the secondary winding 12A are connected between the base and emitter electrodes of the switching transistor 10, while the terminals of the secondary winding 13A are connected between the base and emitter electrodes of the switching transistor 11. Stabilization capacitors 86 and 87 are connected between the collector and base electrodes of the transistors 10 and 11 respectively. Reverse voltage protection diodes 88 and 89 are connected between the collector and emitter electrodes of the transistors 10 and 11 respectively.

The supply voltage for the bus 80 is provided (i) by the starting sub-system 70 when the power supply is first turned on, and (ii) thereafter by a voltage derived from the secondary windings 19G and 19H of the inverter transformer 18 via full wave rectifier diodes 90 and 91 and filter capacitor 81.

Since no voltage is present at the output of the secondary windings 19G and 19H when the power supply is first turned on, no voltage is initially present across the filter capacitor 81 to provide power on the bus 80 to operate the non-coincidence control sub-system 71 and the primary winding drive sub-system 72. Therefore, power for these sub-systems must be initially provided from the starting sub-system 70.

STARTING CIRCUIT

The sub-systems 71 and 72 operate on a substantially lower voltage than is provided on lines 92 and 93 by the rectified line voltage, the voltage between terminals 92 and 93 typically being on the order of 160 volts. This line voltage is filtered by a main filter capacitor 94. Initial operating voltage to the bus 80 is provided by coupling the voltage between lines 92 and 93 to bus 80 through a coupling capacitor 95, a protective resistor 96, and a semiconductor controlled rectifier 97. Since only a limited amount of energy can be coupled to the bus 80 in this manner (since the coupling of such energy will terminate when the capacitor 95 is fully charged), it is essential that the coupling of this initial starting energy to the bus 80 be delayed until the main filter capacitor 94 has become substantially fully charged. If this delay is not provided the limited amount of energy available for initial supply of the bus 80 will be dissipated before the circuitry is able to generate a sufficiently high secondary voltage in windings 19G and 19H to continue the supply of power to bus 80 withou a hiatus, and any such hiatus would preclude starting a normal operation of the power supply shown in FIG. 4.

The desired delay in the initial supply of operating voltage to the bus 80 is provided by the starting sub-system 70, which includes a resistance-capacitance delay circuit comprising resistor 98, time delay capacitor 99, threshold switching element 100 (comprising a neon bulb or suitable avalanche diode), to the triggered electrode of discharge SCR 97 and current limiting resistor 96.

When the power supply shown in FIG. 4 is initially turned on, the main filter capacitor begins to charge through the impedance of the temperature sensitive surge limiter or surgistor 102, which presents a relatively high initial impedance to limit current surge into the capacitor 94, with the impedance of the surgistor 102 decreasing over a period of several seconds thereafter.

The voltage between lines 92 and 93 is coupled through the capacitor 95 and gradually charges the timing capacitor 99 through the resistor 98, the time constant of the elements 98 and 99 preferably being on the order of 0.25 seconds or more and the threshold voltage of the neon bulb 100 being such that the voltage across the timing capacitor 99 becomes sufficiently high to "fire" across the bulb 100 not less than 0.25 seconds after the power supply is initially turned on. When the neon bulb 100 "fires", its impedance rapidly drops, and the energy stored in the timing capacitor 99 discharges through the bulb 100 and the gate to cathode circuit of the controlled rectifier 97, thus rendering said controlled rectifier conductive, and allowing current to flow from the line 92 through the coupling capacitor 95, resistor 96 and anode to cathode circuit of the controlled rectifier 97, to the supply bus 80. Since after the aforementioned 0.25 second time delay the main filter capacitor 94 has become substantially fully charged, the power initially supplied to the bus 80 via the starting sub-system 70 is sufficient to drive the switching transistors 10 and 11 until a sufficient voltage is developed across the secondary windings 19G and 19H to provide feedback of supply voltage to the bus 80. Thereafter the power supply operates in normal fashion, with power for the bus 80 being provided exclusively via the secondary windings 19G and 19H. The capacitor 95 charges to a potential corresponding to the difference between the potential on line 92 (with reference to the ground line 93) and that of the bus 80, and after the capacitor 95 is so charged, no further current flows therethrough. Thus the starting sub-system 70 is only operational for a brief period of time, each time the power supply is turned on.

Figure 6:
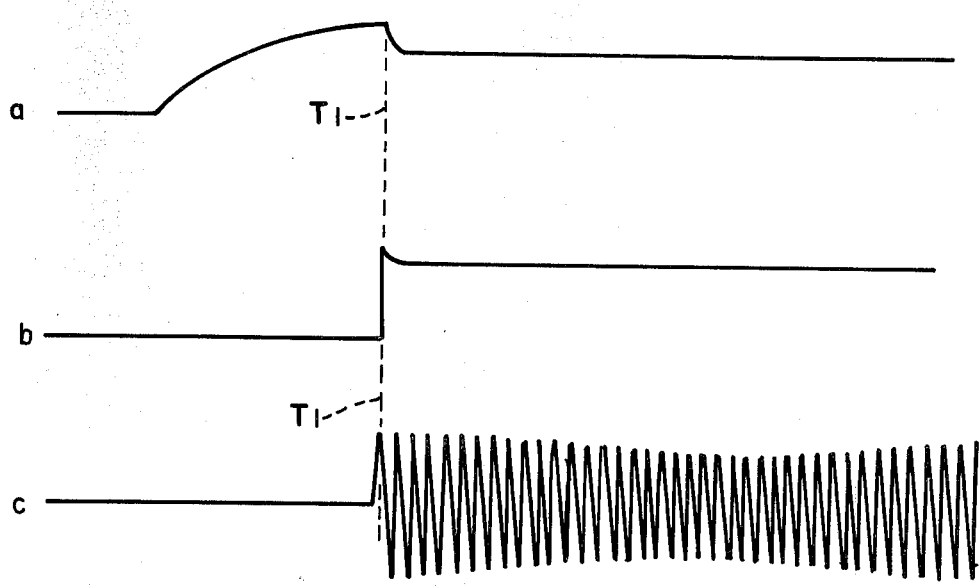
FIG. 6 shows voltage waveforms associated with the operation of the starting circuit utilized in the power supply of FIG. 4.

FIG. 6(a) shows the waveform of the voltage across the main filter capacitor 94, with the power supply turned on at time $t_0$. FIG. 6(b) shows the voltage waveform at the bus 80, said voltage rising from 0 to its operating value at a time $t_1$. As previously mentioned, the delay between $t_0$ and $t_1$ is preferably on the order of 0.25 seconds, although the delay will vary with the parameters of each particular power supply constructed. FIG. 6(c) shows the waveform at the junction 39 between the switching transistors 10 and 11, and indicates that normal switching type operation of the supply begins at time $t_1$.

SWITCHING TRANSISTOR OVERLOAD PROTECTION CIRCUIT

So long as the switching transistors 10 and 11 operate between saturation and non-conduction or open states, power dissipation therein is minimized, and the life of said transistors is not adversely affected. However, in the event that a significant voltage (normally more than 1 to 1.5 volts) should be developed between the collector and emitter electrodes of either transistor while said transistor is conductive, the power dissipation therein rises enormously, and thermal destruction of the transistor will follow unless the power dissipation is immediately halted.

While in many cases it may be sufficient to sense the load current of the transformer 18 and utilize the same for overcurrent control purposes, where high power levels are involved this technique does not always provide adequate control to protect the switching transistors 10 and 11. Also, some circuit conditions may occur which cause excessive power dissipation in the switching transistors 10 and 11 without causing a consequent overload current to flow in the windings of the transformer 18.

Accordingly, the power supply shown in FIG. 4 sheet 2 incorporates a switching transistor saturation voltage sensing sub-system 73, which directly monitors the voltage developed between the collector and emitter electrodes of each of the switching transistors 10 and 11, during the periods when such transistors are conductive.

When the transistor 10 is conductive, a small portion of the emitter current thereof flows through the diode 103 and resistor 104 to the minus supply line 93 providing a potential at the cathode 105 of the diode 103 which is lower than the potential on line 92 by an amount equal to the sum of the saturation voltage between the collector and emitter electrodes of the transistor 10, and the forward bias voltage drop across the diode 103, the latter being substantially constant. A first sensing transistor 106 has the emitter thereof connected to the supply line 92 through a resistor 107, and the collector thereof connected to the negative supply line 93 through resistors 108 and 109. The cathode 105 of the diode 103 is connected to the base of the transistor 106.

The drop across diode 103 is substantially equal to the emitter base voltage to turn on transistor 106 so that current through transistor 106 causes the voltage across resistor 107 to equal the saturation voltage of drive transistor 10. Since the collector current of transistor 106 is substantially equal or proportional to the emitter current, the drop across resistor 109 represents the saturation voltage of transistor 10 during the time transistor 10 is on and can be monitored as herein explained.

Under normal operating conditions the saturation voltage across the transistor 10 is sufficiently small so that the voltage at the cathode 105 of diode 103, and thence at the base of transistor 106 is not sufficiently far below the potential on line 92 to render transistor 106 significantly conductive. However, when the saturation voltage across transistor 10 increases to an unacceptable value, the potential at the base of transistor 106 drops sufficiently below the potential on line 92 to render transistor 106 increasingly conductive, causing collector current to flow through resistors 108 and 109 and raising the potential at the junction of said resistors to a relatively high value. This increase in potential is coupled to the base of transistor 110, which acts as an emitter follower with its base connected to the junction of resistors 108 and 109 and its collector grounded. Operating voltage for the transistor 110 is supplied to the emitter thereof through a potentiometer 111 from line 38 via an inverter 112, so that no voltage for the transistor 110 is supplied during the "dead time" intervals when neither of switching transistors 10 or 11 is conductive. Transistor 110 acts as an emitter follower only during the time that the output of 112 goes positive and the times that transistor 10 should be conducting. During the time that transistor 11 is conducting diode 114 sensing the saturation of transistor 11 acts in lieu of emitter follower transistor 110 to control the emitter voltage of transistor 110 to represent the degree of saturation of transistor 11.

The high voltage developed on emitter line 113 of transistor 110 when the saturation voltage across transistor 10 or 11 is beyond normal limits, is coupled to the base of transistor 43 through the arm of potentiometer 111 and diode 42, FIG. 4 sheet 1, to render transistor 43 conductive and transistor 44 likewise conductive, thus applying + voltage to the control terminal 5 of the multivibrator 30, to reduce the drive time (i.e. conduction time) of switching transistors 10 and 11. Normal operation is automatically resumed, when the saturation voltage across transistor 10 drops to within normal limits.

In similar fashion, during the periods when switching transistor 11 is conductive, a small portion of the current through said transistor flows through potentiometer 111 and diode 114, to hold the potential on emitter line 113 of transistor 110 at a relatively low value, typically 1 to 1.5 volts. However, in the event the saturation voltage between the collector and emitter electrodes of transisitor 11 should increase to a dangerously high level, the voltage on line 113 increases correspondingly, and this increased voltage is coupled to the base of transistor 43 via the arm of potentiometer 111 and diode 42, to render transistors 43 and 44 conductive and apply a relatively high voltage to control terminal 105 of multivibrator 30 to shorten the time of the drive to the switching transistors 10 and 11. As previously mentioned, normal operation is resumed when the saturation voltage across switching transistor 11 returns to normal levels.

The potentiometer 111 serves to adjust the voltage across the main electrodes of the transistors 10 and 11 at which an overload condition is sensed and drive to said transistors is controlled.

Current regulation of the power supply shown in FIG. 4 is accomplished by varying the control voltage applied to terminal 5 of multivibrator 30, to vary the duty cycle of the drive signals to transistors 10 and 11 in accordance with variations in current flow through the secondary winding 19 of the current transformer 18.

Current flow through the secondary winding 19 in this instance is sensed by the center tap winding portion 19i, the center tap 115 of which is connected to the minus of the high voltage supply line 93. The voltage developed across the winding 20A is a measure of the current through the secondary winding 19 (comprising winding portions 19A through 19F) of transformer 18, and is applied across the potentiometer 116. Current transformer 18 could just as well sample the primary current of the main power transformer.

The arm of potentiometer 116, i.e. on line 117, is coupled to a voltage doubler rectifier circuit comprising capacitors 118 and 119 and rectifier diodes 120 and 121. Its voltage developed on line 122 with respect to ground line 93 is approximately the peak-to-peak voltage across winding 20A, and is a measure of current in the primary 19i of the current transformer.

Figure 7:
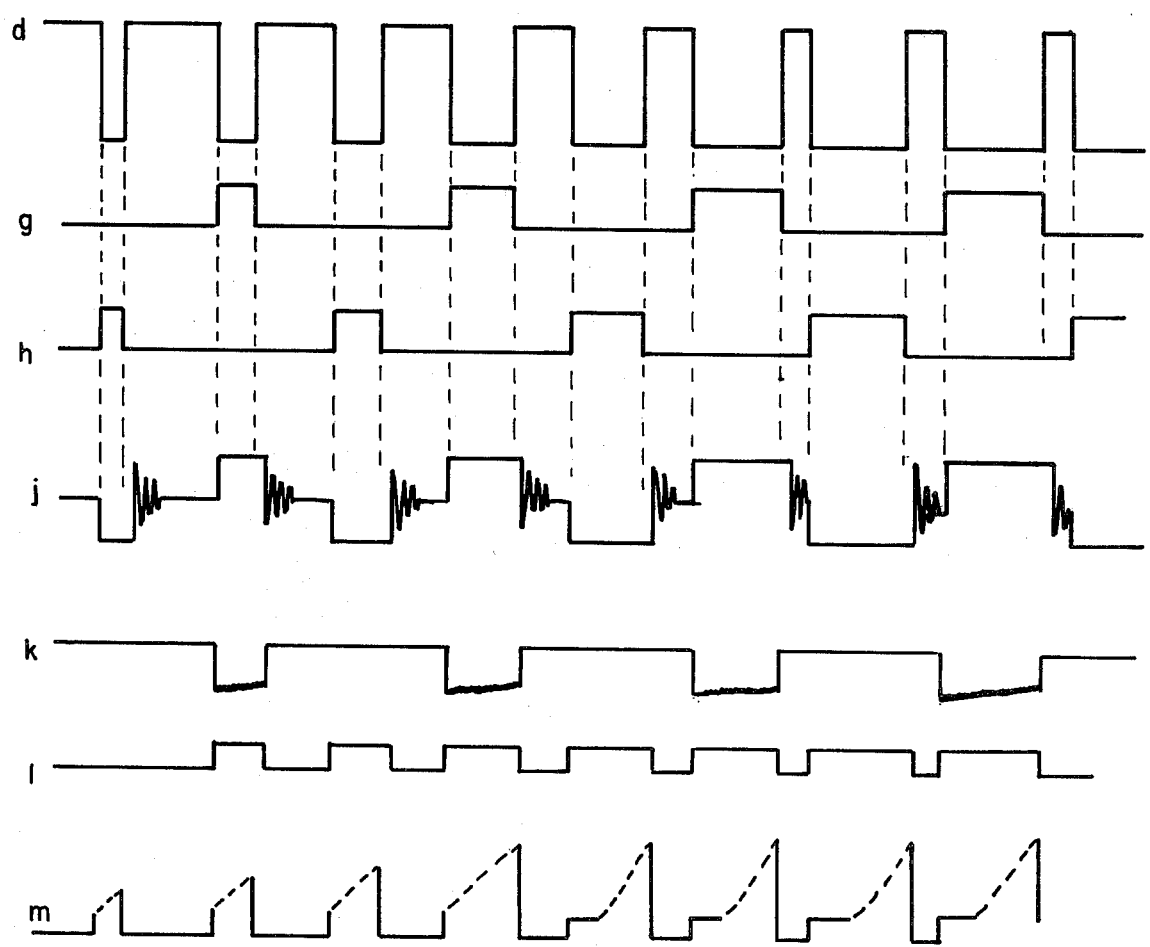
FIG. 7 shows the voltage waveforms associated with the operation of the switching transistor saturation voltage sensing arrangement utilized in the power supply of FIG. 4.

The voltage on line 122, which is a measure of the current flowing through secondary winding 19 of inverter transformer 18, is applied directly to terminal 5 of multivibrator 30 to vary the duty cycle of the drive signals to switching transistors 10 and 11 in accordance therewith, so as to limit current flow in the winding 19 to a desired value. Smoothing of the feedback voltage on line 122 is provided by parallel connected capacitor 119 and 123 and resistor 124, and the feedback capacitor 124a across transistor 44. FIG. 7(k) shows the wave form across resistor 109 (FIG. 4 sheet 2) representing the degree of saturation of transistor 10.

FIG. 7(L) shows the waveform of the voltage developed at the output of the inverter 112 to drive the saturation voltage sensing circuit for transistors 10 and 11, while FIG. 7(m) shows in solid lines the waveform of the voltage at the arm of potentiometer 111 under normal operating conditions, and in dashed lines the waveform of said voltage of the switching transistor 10 and 11 develops excessively high conduction voltage across their main electrodes.

Typically, the voltage on bus 80 (FIG. 4 sheet 1) may be on the order of 12 volts, with said voltage being reduced, via dropping resistor 125 and across Zener diode 126, to supply regulated (VCC) power to the non-coincident control sub-system 71.

As shown in FIG. 4 sheet 3, the secondary winding 19 of the inverter transformer 18 provides three different rectified outputs, at terminals 127, 128 and 129, with respect to ground. The output voltage for terminal 127 is provided by full wave rectification of the signal between terminals 131 and 132 of winding 19, via rectifying diodes 133 and 134, integrating filter inductor 135, and filter capacitor 136. In one example of the invention the voltage at terminal 127 is +30 volts with respect to ground.

The output voltage for terminal 129 is provided by full wave rectification of the voltage between terminals 137 and 138 of winding 19, via rectifying diodes 140 and 141, integrating filter inductor 142, and filter capacitor 143. In the aforementioned example of the invention, the potential at terminal 129 may typically be on the order of −20 volts with respect to ground.

Neither of the output voltages at terminals 127 and 129 is regulated per se, except in respect to the overload duty cycle control as explained above.

SATURABLE REACTOR SECONDARY VOLTAGE REGULATION CIRCUIT

The output voltage at terminal 128, however, is additionally regulated by the saturable reactor secondary voltage avalanche mode duty cycle regulating sub-system 75. This sub-system comprises a saturable reactor 144 having main windings 145 and 146 and a control winding 147.

It should be noted that when controlling the integrated outputs of the several supplies by duty cycle control regulated by sensing the integrated output of one supply, no saturable reactor is used.

If a saturable reactor is used on one or more of the outputs, control or regulation is local. Duty cycle reduction of the main transformer is used only to protect the system from overcurrent or an "out of saturation" power transistor condition.

Power delivery to the terminal 128 is provided from terminals 148 and 149 of secondary winding 19, through corresponding main windings 145 and 146 of saturable reactor 144, corresponding rectifying diodes 150 and 151, integrating inductor 152, and filter capacitor 153.

One end of the control winding 147 is grounded, the other end of said control winding being supplied by bias current by being connected to terminal 129 through a current limiting resistor 154. Alternatively the current limiting resistor 154 could be replaced by a transistor amplifier for supplying initial bias current to the winding 147 and for cutting off the bias current when Zener diode 157 becomes conductive. This arrangement has the advantage of reducing the current drawn by ZENER diode 157, thus allowing a lower power dissipation component to be utilized. The arrangement mentioned in the preceding sentence has the additional advantage of improving the efficiency of the power supply by cutting off current flow through the winding 147 after the initial turn on current. It is evident that by placing the winding 147 in the collector circuit of the aforementioned bias transistor amplifier, the winding 147 can be more rapidly charged, ensuring a faster response to changes in load and circuit conditions, providing improved regulation. The circuit referred to in the preceding sentences is illustrated on sheet 3 of FIG. 4 at block 160. In the block 75, a clamping diode 156 prevents the potential at the junction of resistor 154 and control winding 147 from going tooo high above ground and thus preventing runaway. The junction of diode 156, resistor 154, and control winding 147 is coupled to terminal 128 via a Zener diode 157. Preferably the breakdown voltage of the Zener diode 157 is substantially equal to the output voltage at terminal 128, so that when said output voltage is present the junction point of elements 154, 156, 157 and 147 is substantially at ground potential or slightly positive, providing substantially zero or limited reverse voltage drop across control winding 147, and consequently substantially zero or limited reverse current therethrough, which increases the time to avalanche.

In the above description, sub-system 75 needs to have Zener diode 157 selected to give the exact regulated output. Note that Zener diode 157 in series with diode 156 will provide an output load to prevent a runaway of the regulated output, in the event all loading is lost. The output voltage can never exceed the voltage drop of the Zener diode 157 plus that of the diode 156. Refer to block 160 FIG. 4 sheet 3. In order to provide a precise setting (adjustment of the regulated output the circuit of block 160 is useful), a potentiometer 128A is used to apply a portion of the output through a lower voltage low power Zener diode 157B to the base of a control transistor 161, which supplies the current through the saturation control winding 147 of the regulating saturable reactor 144. Plus voltage on the arm of the potentiometer exceeding the voltage of the Zener diode 157B will lift the base of transistor 161 reducing its current to zero if necessary. Since transistor 161 cannot provide reverse current to winding 147, the reverse winding 147A and current supplying resistor 147B are needed to cause the saturable reactor 144 to provide maximum turn on delay. Alternatively, a resistor from the collector of 161 to a more negative supply voltage (if available) could be used.

When the power supply shown in FIG. 4 sheet 3 initially becomes operative (about 0.25 seconds after it is turned on), there is initially zero voltage developed between terminal 128 and ground. Thus the Zener diode 157 is initially non-conductive.

Very soon after alternate switching action of the transistors 10 and 11 commences, output voltage appears at terminals 127 and 129. This output voltage causes substantial current flow through the control winding 147 of the saturable reactor 144 via resistor 154, with the junction of resistor 154 and control winding 147 being at a negative potential. This substantial current flow through the control winding 147 saturates the square loop magnetic core of the saturable reactor 144, resulting in the presentation of very low impedance to current flow by the main saturable reactor windings 145 and 146. As a result, current flows from the secondary winding 19 (between terminals 148 and 149), windings 145 and 146, rectifiers 150 and 151, and integrating inductor 152 to charge the filter capacitor 153, so that the voltage across said filter capacitor rapidly increases to the desired output voltage at terminal 128. In the aforementioned example, the output voltage at terminal 128 may typically be on the order of +5 volts with respect to ground.

When the output voltage at terminal 128 reaches 5 volts, Zener diode 157 becomes conductive, causing current flow through said Zener diode to raise the potential at the junction of control winding 147 and resistor 154 to approximately zero or slightly plus volts, and essentially reducing or reversing current through the control winding 147. Thus, once normal output voltage at terminal 128 is reached, the control winding 147 biases the saturable reactor, so that the time of saturation of the magnetic core of the saturable reactor 144 is increased.

Thereafter, i.e. once the output voltage at terminal 128 has reached its desired value, the control winding 147 is so biased that on each cycle of voltage applied to the main windings 145 and 146, said windings initially present a high impedance to the flow of current therethrough, and suddenly switch to a low impedance state when the winding current reaches a predetermined threshold value. Changes in output voltage at terminal 128 are thus effectively compensated for by changes in the time in each cycle at which the saturable reactor 144 switches from its high impedance to its low impedance state, i.e. changes in the duty cycle of the current wave form provided through the integrating inductor 152 to the load connected between terminal 128 and ground.

Thus the saturable reactor 144 operates in an avalanche mode, and thereafter operates to control the duty cycle and regulate the output.

By operating in this manner, the saturable reactor sub-system 75 provides regulation of the output voltage at terminal 128 without adversely affecting the voltages of the other output terminals 127 and 129, and without interfering with the overall current regulation of the supply via feedback line 122.

Although only one saturable reactor regulated output has been shown, it should be understood that this technique can be applied to any or to all of the outputs.

What is claimed is:

1. A switching type power supply, comprising:
   a transformer having primary and secondary windings;
   means for coupling said secondary winding to a load;
   first and second alternately conductive semiconductor switching elements coupled in circuit with said primary winding, each of said elements having two main electrodes and a control electrode;
   the main electrodes of said first element being connected in a first circuit path for supplying current to said primary winding from a source of potential difference during first recurrent time intervals;
   the main electrodes of said second element being connected in a second circuit path to permit current flow through said primary winding during second recurrent time intervals when said first circuit path is open; and
   a switching control circuit for providing first periodic switching signals to the control electrode of said first element during said first intervals and second periodic switching signals to the control electrode of said second element during said second intervals, said first and second switching signals being noncoincident, the dead time between successive ones of said first and second signals having a predetermined minimum value established by a given resistance-capacitance timing circuit, said circuit comprising (i) a first multivibrator circuit including said given timing circuit having a first output terminal for generating periodic first control pulses having a predetermined width, (ii) a second circuit synchronously coupled to said first multivibrator circuit and having a second output terminal for generating periodic second control pulses having a width at all times not exceeding the width of said first control pulses, (iii) a common resistance—capacitance timing circuit for both of said circuits, such that said first and second control pulses are mutually synchronized, with the leading edges of the first control pulses occurring coincident with the leading edges of the second control pulses, (iv) a bistable circuit having a clock switching terminal and first and second oppositely phased switch control terminals, (v) means for connecting said first output terminal of said first multivibrator circuit to said clock switching terminal, (vi) means for connecting said first control terminal as as input to a first AND circuit and said second control terminal as an input to a second AND circuit, (vii) means for connecting said second output terminal of said second circuit as another input to each of said AND circuits, and (viii) means for coupling the output of said first AND circuit to the control electrode of one of said switching elements and the output of the second AND circuit to the control electrode of the other of said switching elements.

2. The power supply according to claim 1, further comprising means responsive to the voltage across said load for varying the duty cycle of said second circuit.

3. The power supply according to claim 1, further comprising means responsive to the current through said secondary winding for varying the duty cycle of said second circuit.

4. The power supply according to claim 1, further comprising means for varying the time constant of said timing circuit to vary the frequency of said circuits without varying said dead time.

5. A switching type power supply, comprising:
a main transformer having primary and secondary windings;
main switching means for periodically coupling said primary winding to a source of potential difference;
means for coupling said secondary winding to a pair of output terminals;
a sensing transformer having primary and secondary windings;
sensing switching means coupled to the secondary winding of the main transformer for periodically connecting said primary winding of said sensing transformer across said output terminals; and
control means coupled to the secondary winding of said sensing transformer for varying the duty cycle of said main switching means to control the voltage across said output terminals.

6. The power supply according to claim 5, wherein said sensing switching means comprises a transistor having a base—emitter circuit coupled between one terminal of the secondary winding of said main transformer and one of said output terminals.

7. A switching type power supply, comprising:
first and second alternately conductive semiconductor switching elements, said elements being rendered conductive in response to first and second respective switching control signals, said signals having a predetermined dead time therebetween;
transformer means coupled to said switching elements and to output terminals for connection to a load;
first and second circuit means having a common timing circuit for generating periodic first and second control pulses having substantially coincident leading edges, the width of said second pulses being at all times not greater than the width of said first pulses, the interval between successive ones of said first pulses being established by said timing circuit and defining said dead time;
a bistable circuit for generating first and second rectangular waveforms having transitions aligned with the trailing edges of said first control pulses; and
first and second AND gates responsive to said second control pulses and respective ones of said rectangular waveforms for modifying said rectangular waveforms to provide transitions therein corresponding to the leading and trailing edges of said second control pulses, the outputs of said AND gates corresponding to said modified waveforms and to said first and second switching control signals respectively.

8. The power supply according to claim 7, wherein the width of said interval is greater than the maximum storage time of each of said switching elements.

9. In a switching type power supply having first and second alternately conductive semiconductor switching elements, said elements being operated between saturation and open circuit conditions, circuit protection means comprising:
a first sensing transistor having control and output electrodes;
means for coupling the voltage developed across said first switching element to the control electrode of said first sensing transistor when said first element is conductive, said first sensing transistor conducting a relatively low current when said first element is saturated and a relatively high current when said first element is not saturated, and the voltage at said output electrode thereof having a first value when said first element is saturated and a second value when said first element is not saturated;
a second sensing transistor having emitter, base and collector electrodes;
means for coupling the output electrode of said first sensing transistor to said base electrode;
means for coupling the voltage developed across said second switching element to the emitter electrode of said second sensing transistor when said second element is conductive, said coupled emitter voltage being relatively low when said second element is saturated and being relatively high when said second element is not saturated, said emitter voltage also being relatively high when said base voltage is relatively high, i.e. when said first switching element is not saturated;
periodically conductive biasing means for providing a bias voltage to said emitter of said second sensing transistor only when each of said switching elements is conductive; and
means for reducing the periods of conduction of said switching elements when the voltage at said emitter electrode of said second sensing transistor exceeds a predetermined threshold value.

10. The circuit protection means according to claim 9, further comprising diode means for isolating said first sensing transistor from said second switching element and for isolating said second sensing transistor from said first switching element.

11. In a switching type power supply having a pair of alternately conductive switching elements, rectifying and capacitive filtering means coupled to said switching elements, a control circuit coupled to said filtering means and to said switching elements, and transformer means for coupling said switching elements to a pair of secondary output terminals, said control circuit initially receiving power from said filtering means and subsequently receiving power from said output terminals, a starting circuit comprising:
an auxiliary filter capacitor capacitively coupled to said filtering means;
a time delay switching circuit coupled in series between said filtering means and said auxiliary capacitor, said circuit coupling said auxiliary capacitor to said filtering means for a limited time interval a predetermined time after charging of said filtering means has commenced,
said control circuit being coupled to receive power initially from said auxiliary capacitor, and
means for coupling said output terminals to said auxiliary capacitor to provide power to said control circuit before said limited time interval has elapsed.

12. The starting circuit according to claim 11, wherein said time delay circuit comprises a controlled rectifier, a resistance-capacitance timing circuit including a threshold element for providing a gate voltage to said rectifier after said predetermined time, and a resistor in series with the main electrodes of said rectifier, said rectifier being coupled in series between said auxiliary capacitor and said filtering means.

* * * * *